UNITED STATES PATENT OFFICE.

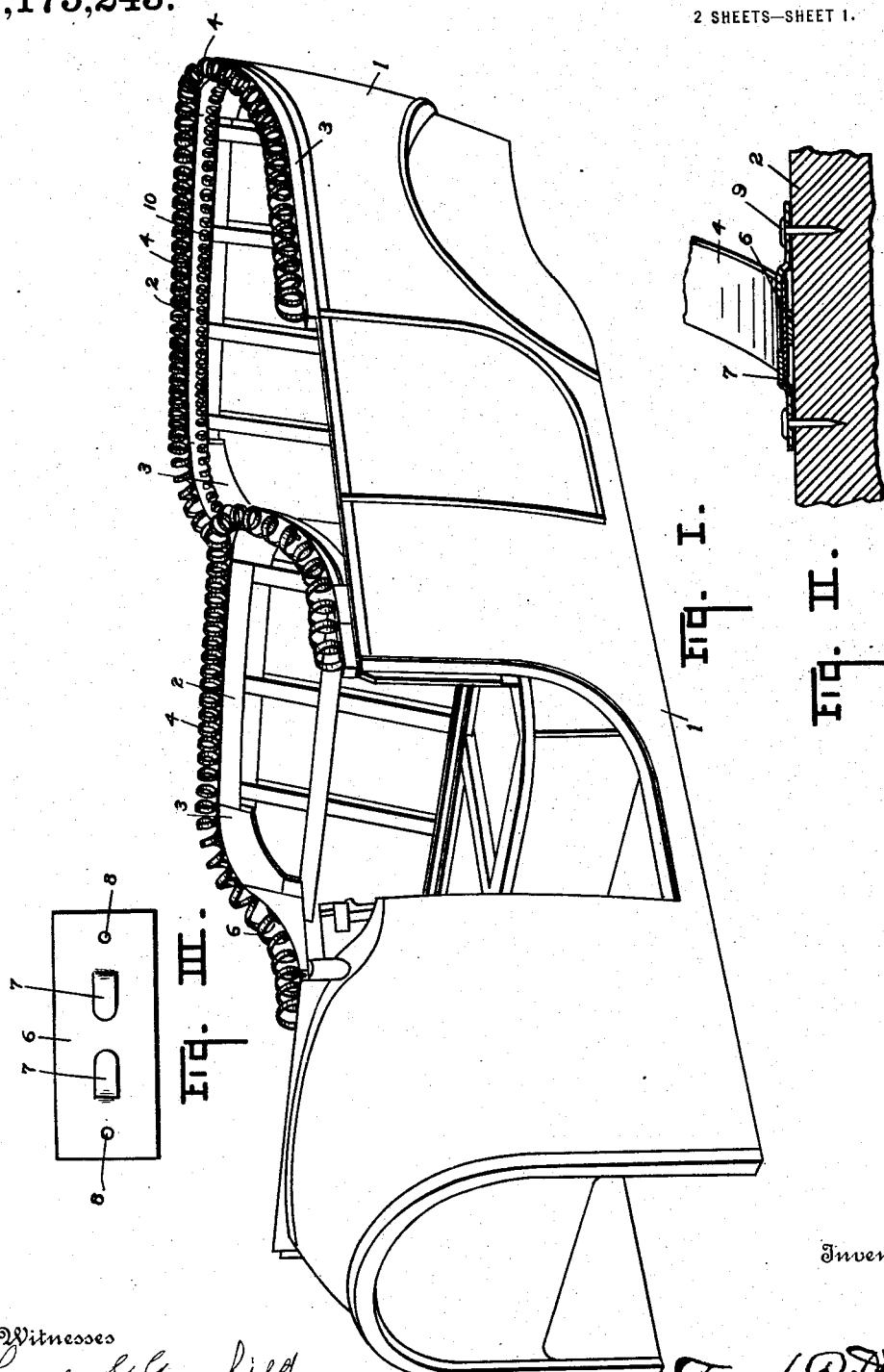

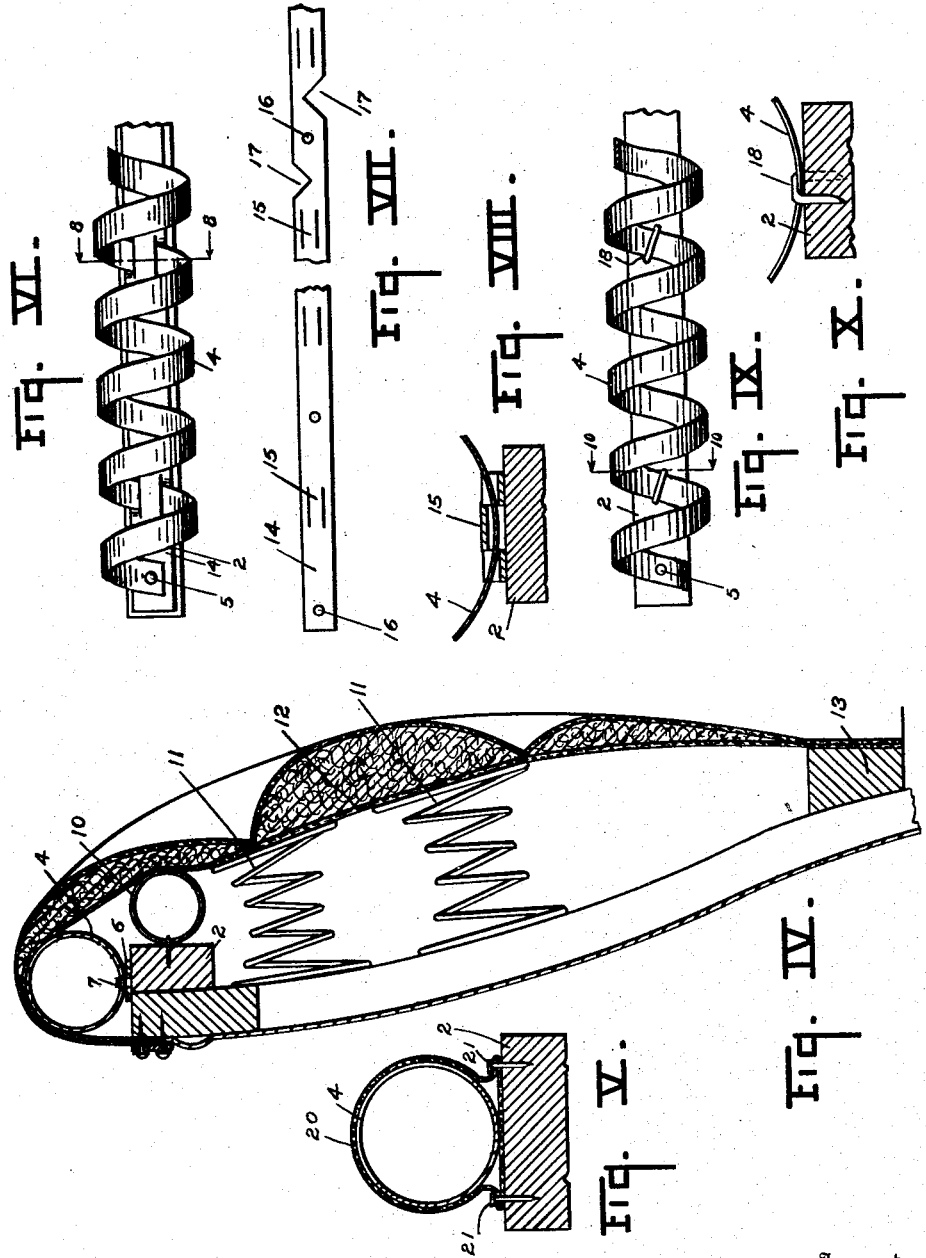

FRANK P. D'ARCY, OF KALAMAZOO, MICHIGAN.

CUSHION STRUCTURE.

1,175,243.  Specification of Letters Patent.  Patented Mar. 14, 1916.

Application filed May 18, 1914. Serial No. 839,473.

*To all whom it may concern:*

Be it known that I, FRANK P. D'ARCY, a citizen of the United States, residing at Kalamazoo, Michigan, have invented certain new and useful Improvements in Cushion Structures, of which the following is a specification.

This invention relates to improvements in cushion structures.

My improvements are particularly designed by me for automobile seat back cushions and I have shown the same embodied in such a structure. They are, however, readily adapted for use in various cushion structures such as sofas, chairs, mattresses and the like.

The main objects of this invention are: First, to provide an improved cushion structure having a spring border. Second, to provide an improved spring for the borders of cushions, such as the upholstered back of automobile seats and the like. Third, to provide an improved cushion structure having the advantages above set forth, which is economical to produce, quickly assembled and one which is very satisfactory in use.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a front perspective view of an automobile body embodying the features of my invention before the upholstering is applied to the seat backs. Fig. II is an enlarged detail section showing one of the attaching clips as employed in Fig. I. Fig. III is a plan view of one of the attaching clips. Fig. IV is a detail vertical section through a back structure with the upholstering in position thereon. Fig. V is an enlarged detail section of a modified structure, the modifications being in the means for securing the border spring. Fig. VI is a detail plan view of another modification, the modification being in the spring attaching means. Fig. VII is a detail plan view of the attaching strip of Fig. VI. Fig. VIII is a detail transverse section on a line corresponding to line 8—8 of Fig. VI. Fig. IX is a detail plan view showing still another modification of the attaching means. Fig. X is a transverse section on a line corresponding to line 10—10 of Fig. IX.

In the drawing similar reference characters refer to similar parts throughout the several views, and the sectional views are taken looking in the direction of the little arrows at the ends of the section lines.

Referring to the drawing, 1 represents an automobile body having seats provided with back top rails 2 and side top rails 3. These top rails are for convenience made up of sections. The details of the seat body form no part of my present invention and are therefore not further described. On the top of the rails I mount the coiled band border springs 4, the springs preferably being continuous around the back, that is, a single spring is extended from the front end of one arm around the back to the front end of the other arm. The ends of the springs are secured rigidly by means of nails at 5. A part of the coils are attached by means of clips 6, which have opposed tongues 7 adapted to engage the coils, the clips being perforated at 8 to receive the nails 9. See Figs. II and III. These clips engage the coils so that they have a sliding movement, that is, they are free to move spirally and this allows the springs to yield when pressure is exerted thereon. I also preferably mount a border spring 10 on the front or inner side of the top rails. The border spring 10 is of a less diameter than the top border spring. The cushion body springs 11 are mounted on the back frames to support the upholstering comprising an inner covering 12 arranged over the body springs and secured to the bottom piece 13 of the back and extended over the border springs and secured to the rear side of the top rail, as shown in Fig. IV. The covering is preferably provided with a filling of curled hair and is tufted as is customary.

The border springs retain the shape of the cushion at the border and at the same time afford suitable resiliency at this point. It is customary to stuff the edges of the cushions with hair to provide the proper contour, but it is difficult to maintain this in proper position and further the curled hair is expensive and to properly build up the cushion at the edges to get the roll effect requires a large amount of hair.

It will be understood that my improved border spring is equally well adapted for use on the back or arms of chairs, sofas and the like, and may be applied to seat cushions. It is particularly advantageous however for back cushions.

In the modification shown in Fig. V the spring is incased in a tube 20, which is drawn down into attaching webs 21.

In Figs. VI, VII, and VIII, I have illustrated a metal attaching strip 14 having attaching loops 15 struck up therefrom at intervals to engage spaced coils, as in Fig. VI, there being a loop every fourth coil in the figure illustrated. The attaching strip is notched at 17 so that it may be bent around the corners in applying it to the frame. The advantage of the clip 6 is that the clips may be placed and the springs attached to any frame while the attaching strip 14 should be made of the proper length for the particular frame. The loops 15 have sliding engagement with the coils so that they are free to slide therein.

In the modified structure shown in Figs. IX and X ordinary staples 18 are employed for attaching the coils. These staples are preferably not driven in far enough to clamp the coils but to permit the sliding movement of the coils therein.

My improved border spring is very economical to produce and may be quickly applied resulting in a considerable saving of labor in the upholstering of a structure such as an automobile back and also in a saving in the filling material or curled hair, and further, the structure effectively maintains its shape.

I have illustrated and described my improvements in a satisfactory embodiment and in certain modifications, thereby showing the general application thereof. I have not attempted to illustrate or describe various other modifications and adaptations which I contemplate as I believe the disclosure made will enable those skilled in the art to which my invention relates to embody or adapt the same as may be desired, and I desire to be understood as claiming my invention specifically as well as broadly within the scope of the appended claims.

Having thus described my invention, what I claim as new and desire to secure by Letters Patent, is:

1. In a structure of the class described, comprising back and side portions provided with top rails, the combination of spirally coiled band springs disposed on their sides on the front and top of said top rails, the ends and a part of the coils of said springs being secured to said rails, the securing means for the coils permitting movement of the attached coils in the direction of their spirals, cushion body springs disposed below said top rails, and an upholstering covering extending over said body and rail springs.

2. In a structure of the class described, comprising back and side portions provided with top rails, the combination of a spirally coiled band spring disposed on its side on said top rails, the ends and a part of the coils of said spring being secured to said rails, the securing means for the coils permitting movement of the attached coils in the direction of their spirals, cushion body springs disposed below said top rails, and an upholstering covering extending over said body and rail springs.

3. In a structure of the class described, comprising back and side portions provided with top rails, the combination of a spirally coiled band spring disposed on its side on said top rails, cushion body springs disposed below said top rails, and an upholstering covering extending over said body and rail springs.

4. In a cushion structure, the combination with the frame, of spirally coiled border springs disposed on their sides on the edge and front side of the frame, said springs being secured to said frame by means permitting spiral movement of the coils, and a cushion covering extended over said border.

5. In a cushion structure, the combination with the frame, of a spirally coiled border spring disposed on its side on said frame, said spring being secured to said frame by means permitting spiral movement of its coils, and a cushion covering extended over said border.

6. In a cushion structure, the combination with a frame, of spirally coiled border springs disposed on their sides on the sides and front of the frame, and a cushion covering extending over said springs.

7. In a cushion structure, the combination with a frame, of a spirally coiled border spring disposed on its side on the edge of the frame, and a cushion extending over said border spring.

8. In a structure of the class described, the combination with a frame, of a spirally coiled band spring disposed on its side on said frame, and attaching clips for said spring provided with opposed spaced tongues engaged with the coils of said spring.

9. In a structure of the class described, the combination of a frame, a spirally coiled spring disposed on its side on the edge of said frame, spaced members engaging a part only of the coils of said spring and permitting spiral movement of the engaged coils and cushion body springs mounted on said frame, and an upholstering covering extending over said covering and said border springs.

In witness whereof, I have hereunto set my hand and seal in the presence of two witnesses.

FRANK P. D'ARCY. [L. S.]

Witnesses:
RUTH B. HALL,
GEORGE T. SCULLY.